July 19, 1955  G. N. FORTUNA  2,713,374
SECTIONAL VEHICLE WHEEL
Filed Dec. 14, 1951  2 Sheets-Sheet 1
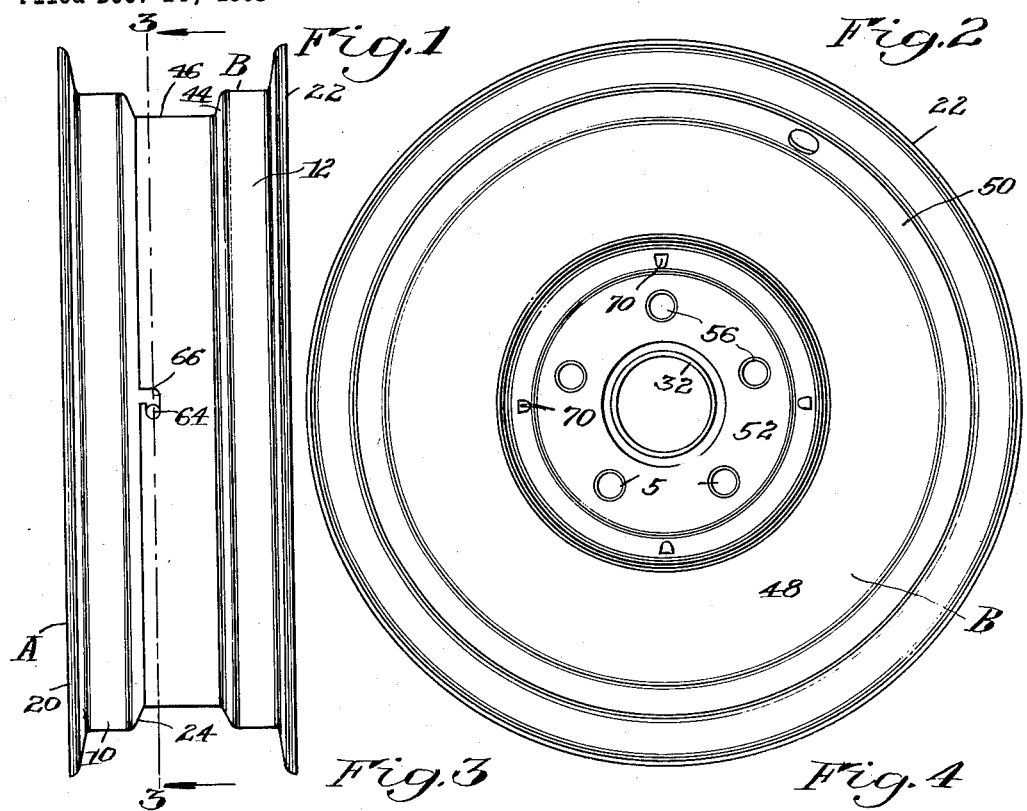
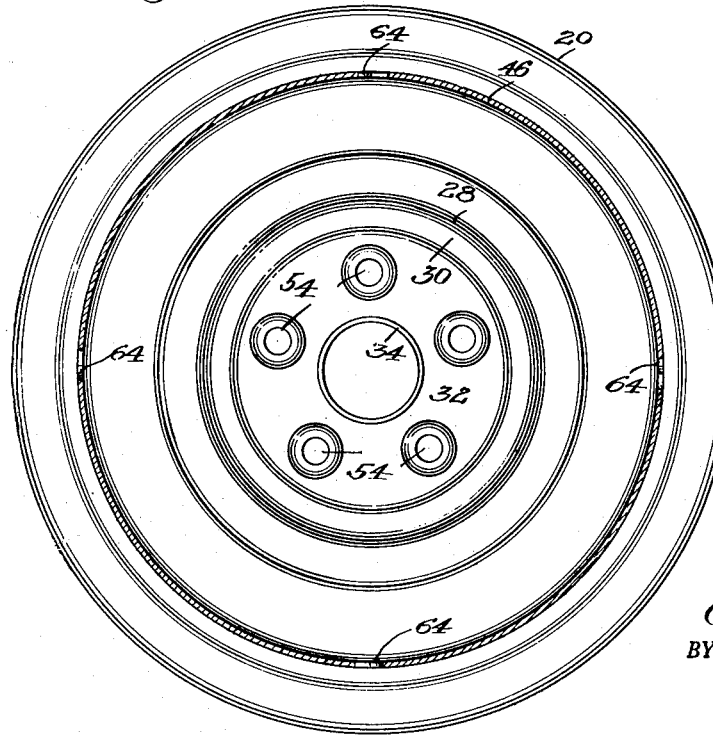
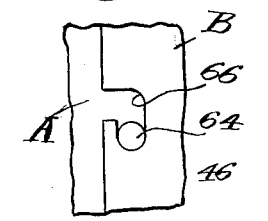
INVENTOR.
George N. Fortuna
BY Charles Shepard
his Attorney July 19, 1955  G. N. FORTUNA  2,713,374
SECTIONAL VEHICLE WHEEL
Filed Dec. 14, 1951  2 Sheets-Sheet 2
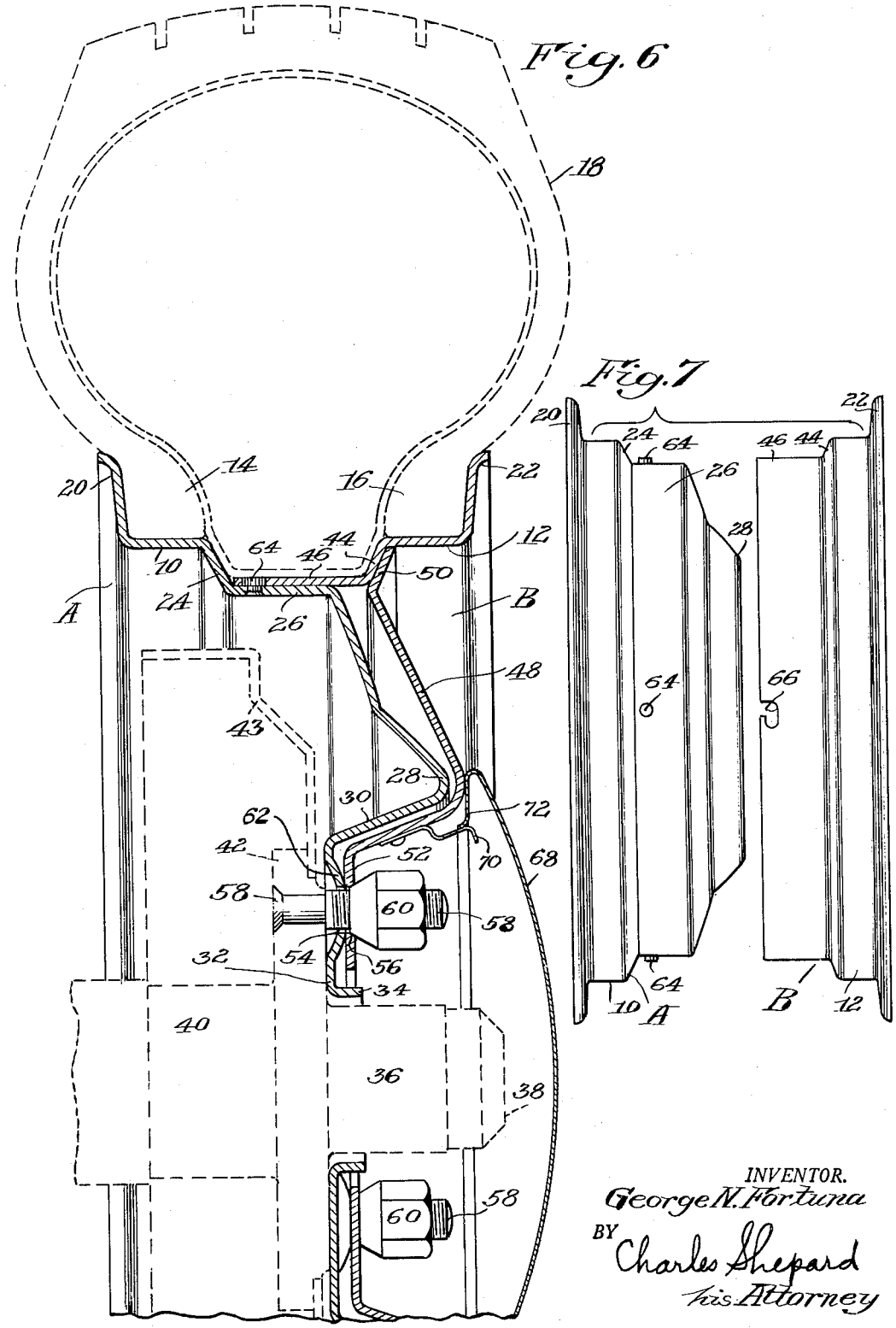
INVENTOR.
George N. Fortuna
BY Charles Shepard
his Attorney

United States Patent Office

2,713,374
Patented July 19, 1955

2,713,374

SECTIONAL VEHICLE WHEEL

George N. Fortuna, Rochester, N. Y.

Application December 14, 1951, Serial No. 261,709

1 Claim. (Cl. 152—412)

The present invention relates to vehicle wheels and more particularly to pneumatically tired wheels having flanged rims for supporting and confining the beads of the tire and it has for its broad object to provide an improved wheel so constructed as to greatly facilitate the application and removal of the tire without resorting to the use of tools or the well known demountable rim as a separate component of the wheel and tire assembly.

A further object is to apply such improvements to a demountable wheel of the modern type in such manner that the rim referred to, namely, the felly portion and associated bead confining flanges are split and separable, to release the tire along with separable wheel body sections by which they are jointly carried, the means for securing the wheel sections to the axle bearing and to each other serving also to maintain the bead confining flanges against the tire.

Another object of the invention is to further equip such a wheel with means whereby the wheel sections may be independently, temporarily locked together with the tire confined thereon and all applied to the axle as a unit pending the subsequent fastening of the wheel assembly thereto.

These and other desirable objects may be attained in the manner disclosed as an illustrative embodiment of the invention in the following description and in the accompanying drawings forming a part hereof, in which:

Fig. 1 is a front or edge elevation of a vehicle wheel constructed in accordance with and illustrating one embodiment of the present invention.

Fig. 2 is a side elevation thereof with the hub cap removed;

Fig. 3 is a vertical section on the line 3—3 of Fig. 1 revealing most of the inner sectional part of the two part wheel in side elevation;

Fig. 4 is an enlarged, fragmentary plan view of the bayonet joint interlock between the wheel sections shown in engaged position;

Fig. 5 is a similar view showing the same in disengaged position;

Fig. 6 is a much enlarged fragmentary sectional view in the plane of the axis of the wheel; and Fig. 7 is a view similar to Fig. 1 but showing the inner wheel sections detached and separated.

The same reference numerals throughout the several views indicate the same parts.

Referring first to Figs. 1, 6 and 7, the entire wheel is composed of only two relatively superposed constituent body members or sections A and B. They jointly provide a rim portion embodying inner and outer felly seats 10 and 12 for the beads 14 and 16 respectively of the usual pneumatic tire shoe 18 shown in dotted lines in Fig. 6 which beads are laterally retained by adjacent flanges 20 and 22 extending radially from the respective seats. The inner section A, in the present embodiment of the invention consists of an outwardly dished circular stamping of sheet steel formed as follows in proceeding from the periphery toward the center; the radial flange 20, the felly seat 10 bent outwardly and thence toward the wheel axis at 24 to emerge with an outwardly extending portion 26 parallel with the seat 10 and constituting an intermediate drum; toward the axis again and also outwardly to the extreme of the dish formation at 28 and thence inwardly again at 30 to join with a central disk portion 32 and a final outward flange 34. This latter encircles vehicle axle housing 36 of an axle 38 as a part of an axle bearing 40 that includes an intermediate wheel attaching flange or hub 42, all of the last named parts being shown in dotted lines in Fig. 6 including also the usual brake drum 43 customarily included in the hub assembly but unimportant to the present disclosure.

Cooperatively and in a complementary manner, the outer section B consists of a similar pressed sheet steel structure formed as follows in also proceeding from the periphery toward the center, the radial flange 22, the felly seat 12 bent inwardly therefrom and thence toward the wheel axis at 44 to merge with an inwardly extending portion 46 parallel with the seat 12 and constituting an intermediate drum that slidably (in assembly) fits over and upon the drum 26 of the inner section A.

For reasons of shop practice and manufacturing technique, the main body of the outer section B is preferably composed of an outwardly dished circular stamping of sheet steel 48 that somewhat conforms to and overlies the dished portion 28 of section A. At its outer circumference it terminates in a flange 50 that is spot or otherwise welded to the portion 44 connecting the bead seat 12 with the drum 46. At its center it is formed into a flat disk 52 that is superposed upon and overlies disk 32 on section A.

The two disks 32 and 52 aside from the alined central openings through which the bearing housing projects, are provided also with a circularly arranged series of alined bolt openings 54 and 56 surrounding such central opening and adapted to receive the usual bolts or lag screws 58 riveted, in the present showing, fixedly into the hub 42. Nuts 60 on these bolts clamp the disks 32 and 52 firmly together and hence the wheel sections A and B also in which connection it is noted that the bolt openings in the under disk 32 are preferably provided with pressed out marginal bosses 62 to improve firm and even contact with disk 52.

As so far described, it is apparent that the full assembly of Figs. 1, 2, and 6 retains the tire upon the rim portion of the wheel in much the usual manner. To remove the tire, the nuts 60 are removed, wheel section B is detached from and pulled away from section A, the lateral confinement of the tire beads 14 and 16 is thereby released, and the tire slips off of the two felly seats 10 and 12 and drum 46. Also, as so far described, this could be done with or without demounting the wheel as a whole from the hub that supports it. But it is, at present, preferred to manipulate the tire equipped wheel as a whole in accordance with the present practice with respect to demountable wheels in general in removing the old tire and substituting the new one (or repairing and remounting the old one), namely, by removing and reapplying wheel and tire together.

In any case, it is preferred to provide additional means for preliminarily securing the wheel sections together in tire supporting cooperation when the wheel is demounted from its hub so that, for instance, in reapplying the tire to the rim the continuity of procedure may be to lay inner section A flat upon the ground; drop the tire over it so that inner bead 14 engages felly seat 10 and flange 20; drop outer section B upon the tire so that felly seat 12 and flange 22 thereof properly engage outer bead 16, and press overlying section B against section A so that the whole assembly may be applied to the hub 36—40 as a unit. However, it is convenient to first partially inflate the tire or, if it is to be used as a spare, to fully inflate it.

It is toward these ends that the drum portion 26, previously described, is provided on inner wheel section A, and the complementary drum portion 46, also previously described, is provided on outer wheel section B to firmly, telescopically engage over it. Inner drum 26 is fitted with a plurality of projecting pins 64 with which engage corresponding L-shaped or angular slots 66 each having an entrance portion extending axially from the free edge of the outer drum 46 and a retaining portion extending circumferentially of this drum from the entrance portion (see Figs. 4 and 5), so that, in the familiar manner of a bayonet joint, the drums may be pressed together, given a partial relative rotation and a locking engagement of the tire is thus secured between the two wheel sections. Of course the limit of such locking rotation is such as to bring the bolt holes in the central disks 32 and 52 into alinement.

The drawings also show in Fig. 6, provision for detachably securing the usual hub cap disk 68 to outer section B, the inner side of the outwardly dished portion thereof near the center being provided with a plurality of suitable spring clips 70 by which a reverse flange 72 on the cap is engaged. This encloses, conceals and protects all centrally arranged parts.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

A demountable vehicle wheel for the support of a pneumatic tire, said wheel comprising separable inner and outer overlying body sections each embodying an outwardly dished pressed metal stamping including a substantially flat disk portion at the center, such disk portions being superposed upon one another and provided with alined central openings for the reception of a hub and with a plurality of bolt holes surrounding the openings, the peripheral portion of the inner body section being bent to comprise integrally, and progressively toward the center, first, a substantially radially disposed flange for laterally engaging the inner tire bead, thence axially outwardly to form a felly support for that bead, thence toward the wheel axis and again outwardly to produce a drum portion, and the peripheral portion of the outer section being formed to comprise progressively toward the center, first a substantially radially disposed flange for laterally engaging the outer tire bead, thence axially inwardly to form a felly support for that bead, thence toward the wheel axis and again inwardly to produce a drum portion telescoping snugly and axially upon the drum portion of the inner wheel section and bearing radially against it, the two telescoped drum portions serving as the bottom of a circumferentially extending tire-receiving channel, a plurality of L-shaped slots formed in one of said telescoping drum portions, each slot having an entrance portion extending axially from a free edge of such drum portion and a retaining portion extending circumferentially from the entrance portion, a corresponding plurality of pins mounted on the other of said telescoping drum portions and adapted to enter the entrance portions of said slots when the two drum portions are being telescoped together and then to enter the retaining portions of said slots when one of said wheel sections is slightly rotated relative to the other section, said bolt holes in the disk portions of the two sections being out of alinement with each other when said pins of one section are in the entrance portions of the respective slots of the other section, said bolt holes being alined with each other when said pins of one section are in their normal locked position in the retaining portions of the respective slots, so that hub bolts may pass through the alined bolt holes of both wheel sections to secure both wheel sections to a wheel hub and also to hold one wheel section against rotation relative to the other section to a position releasing said pins from said retaining portions of the respective slots.

References Cited in the file of this patent
UNITED STATES PATENTS

| | | |
|---|---|---|
| 2,150,650 | Errig | Mar. 11, 1939 |
| 2,209,803 | Webb | July 30, 1940 |
| 2,488,762 | Burns, Jr. | Nov. 22, 1949 |